April 21, 1970 W. J. BENNETT 3,507,476
JACK FOR CAMPER

Filed April 10, 1968 2 Sheets-Sheet 2

INVENTOR
WINTON J. BENNETT
BY Jeffers and Young
ATTORNEYS

United States Patent Office 3,507,476
Patented Apr. 21, 1970

3,507,476
JACK FOR CAMPER
Winton J. Bennett, 1500 S. Dallas,
Auburn, Ind. 46706
Filed Apr. 10, 1968, Ser. No. 720,019
Int. Cl. B66f 7/26
U.S. Cl. 254—45                  10 Claims

ABSTRACT OF THE DISCLOSURE

A jack structure for a camper or coach body in which the jack comprises a jack structure having a base with legs extending angularly from the base and at an angle to each and detachable from the base and in which the jack structure comprises a tubular upper member for engagement with the underside of the camper or coach body and wherein the legs when detached from the base of the jack can be connected to the upper member in parallel relation thereto. Further, the camper or coach body has clip means on the underside for detachably receiving and supporting the jacks when the legs of the jacks have been detached from the base thereof, and have been connected, to the upper member thereof. The camper or coach body is provided with a jack engaging member at each corner.

The present invention relates to campers of the type adapted for detachable mounting on a conveying vehicle, such as a pickup truck or the like, and is particularly concerned with a special jack arrangement by means of which the camper can be lifted from the truck or supported during storage.

Campers or coach bodies, of the nature referred to, are adapted for being secured to the beds of pickup trucks to be conveyed thereby. One particular advantage of such campers is that an existing vehicle can be employed, and furthermore, when the camper is not in use, it can be removed from its conveying vehicle and the vehicle can be employed for other purposes. The campers are bulky and are relatively heavy and there is thus somewhat of a problem presented in mounting the camper on a pick truck and in removing the camper from the pickup truck, and in safely supporting the camper when it is not mounted on the truck.

Heretofore, various arrangements have been proposed for this purpose and one such arrangement is illustrated in my prior Patent 3,269,574 issued Aug. 30, 1966. This patent shows a central adjustable jack on the side of the camper or coach body and support members on each side of the camper or coach body at each end thereof having predetermined adjusted positions. The camper or coach body is lifted from the pickup truck body by operating the central jack and then, at least the support members are locked in position with the camper elevated.

A defect of the arrangement shown in my prior patent is to be found in the location of the adjustable jack in the center of the camper which required that the jack be operated at the same rate to prevent the camper from becoming tilted and also to prevent the upper end of the jack bar extending along the outside of the camper from denting the side wall of the camper.

Another defect in the arrangement of my prior patent is to be found in the fact that the jack and corner support members are made up so that they cannot easily be knocked down for storage whereby a problem presents itself in respect of transporting the jack and support members with the camper.

With the foregoing in mind, it is a primary objective of the present invention to provide an improved jack structure for use with coach bodies or campers of the nature referred to.

Still another object of this present invention is the provision of a novel jack structure for lifting coach bodies or campers of the nature referred to and for holding the coach bodies or campers in elevated position in which the possibility of damaging the coach body or camper during a lifting or lowering operation thereof is substantially eliminated.

A still further object of the present invention is the provision of a jack structure of the nature referred to which can be knocked down so as to form a compact unit for ready transport.

A further object is the provision of a knock-down jack as referred to above, together with an arrangement for securing the jack in knocked down condition directly to the coach body or camper with which it is to be used.

Still another object of the present invention is the provision of an arrangement for operatively connecting a jack of the nature referred to with a coach body or camper in such a manner that there is little, if any, likelihood of the coach body or camper becoming damaged during a lifting or lowering operation thereof because of one or more jacks being operated more rapidly than the others thereof.

The objectives referred to above are obtained, in brief, by providing a coach body or camper with four elements at the corners thereof for engagement with the upper ends of jack arrangements and which jack arrangements at their lower ends have detachable legs extending therefrom. The jacks are disposed completely under the camper or coach body and thus have no jack shaft or the like extending upwardly along the side of the camper or coach body which could form dents in case the jacks were operated unevenly and the camper tilted. Still further, the jacks, when collapsed, are arranged to form a compact unitary assembly that can readily be secured to, for example, the underside of the coach body or camper for being transported therewith.

The several objects of the present invention referred to above, as well as still other objects and advantages thereof will become more apparent upon reference to the following detailed specification taken in connection with the accompanying drawings in which.

Figure 1:
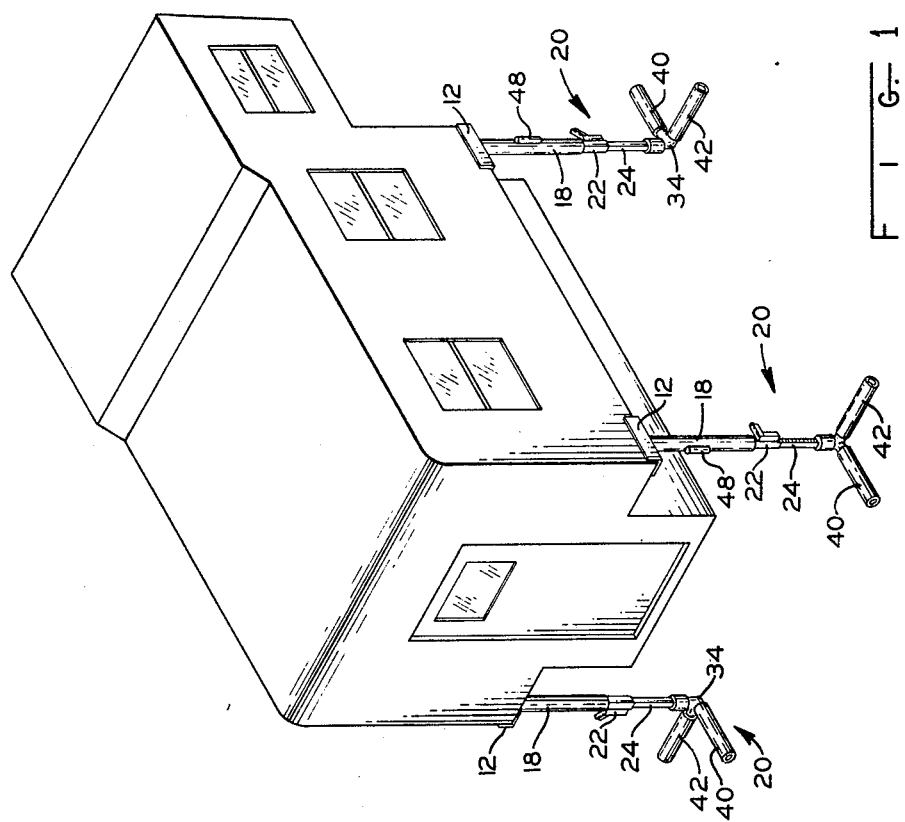
FIGURE 1 is a perspective view showing a coach body or camper having jacks at the corners thereof according to the present invention.

Referring to the drawings somewhat more in detail, FIGURE 1 shows a coach body or camper 10 which is, in general, of conventional construction. The camper 10 according to the present invention, has bracket members 12 at the corners, each of which may comprise, as will be seen in FIGURE 3, an angle member 14 having a flange disposed in engagement with outside wall of the camper at the pertaining corner and another flange extending beneath the camper body at the pertaining corner and secured to the camper body in any suitable manner.

Secured to the underside of each bracket member 12 and projecting vertically downwardly therefrom is a stud 16 which may be, as shown, fluted so that it will readily be received in the upper end of a tube or pipe length 18 forming a portion of the jack structure for the respective corner. FIGURE 1 will show that there is one of the bracket members 12 at each corner of the camper and that there are no bracket members or jacks disposed intermediate the corners of the camper.

Pertaining to each bracket member is an associated jack generally indicated at 20 and each thereof includes the tube or pipe section 18 above referred to which, at its upper end, receives the corresponding stud 16.

Figure 3:
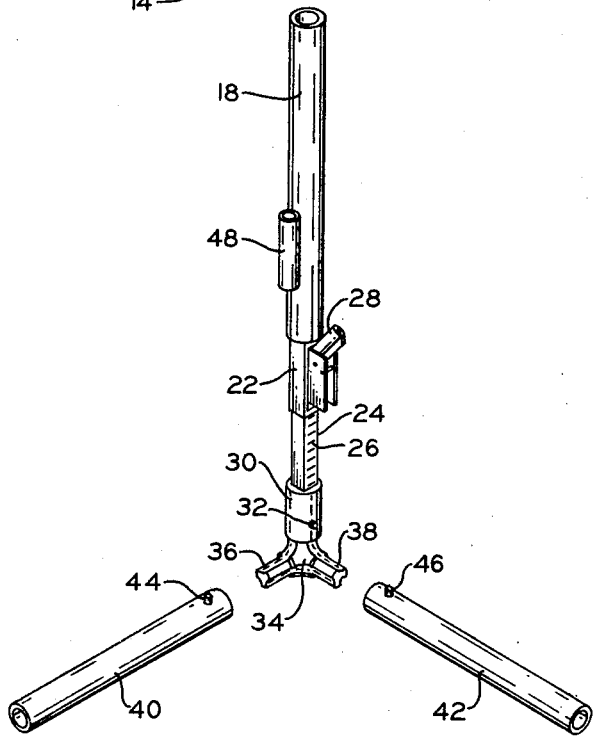
FIGURE 3 is a perspective view with certain parts separated from each other showing in more detail the construction of the jack according to the present invention and the maner in which it engages the pertaining corner of the camper.

Each tube 18, as will be seen in FIGURE 3, at its lower end engages or is secured to a frame 22 which is slidable along post or shaft 24 of the respective jack. Post or shaft 24 comprises teeth 26 engaged by movable pawl means in frame 22 so that the frame 22 can be raised and lowered on post or shaft 24 in a conventional manner. Frame 24 comprises the pivoted socket member 28 which is adapter for receiving a jack handle such as is employed with conventional bumper jacks.

At its lower end, shaft or post 24 is received in a sleeve-like member which is adapted for being secured, as by a set screw 32, to one leg of a member 34 which has two other legs 36 and 38 extending therefrom at substantially right angles to each other and also substantially at right angles to the leg received in sleeve 30.

Each of the legs 36 and 38 is adapted for receiving a respective pipe length 40, 42 adapted for being secured to their respective legs, as by the set screws 44, 46.

A further feature of the present invention is to be found in the tube or rod 48 mounted on tube or pipe section 18 somewhere intermediate the ends thereof and in substantially parallel spaced relation thereto. The connection of member 48 to tube or pipe section 18 is best shown in FIGURE 2 where it will be seen that a short post 50 forms the connection between member 48 and pipe section 18 so that there is a space therebetween and whereby the legs 40 and 42 of the jack can be removed therefrom and placed on member 48 as shown in FIGURE 2 and connected thereto by tightening of the set screws 44 and 46.

Figure 2:
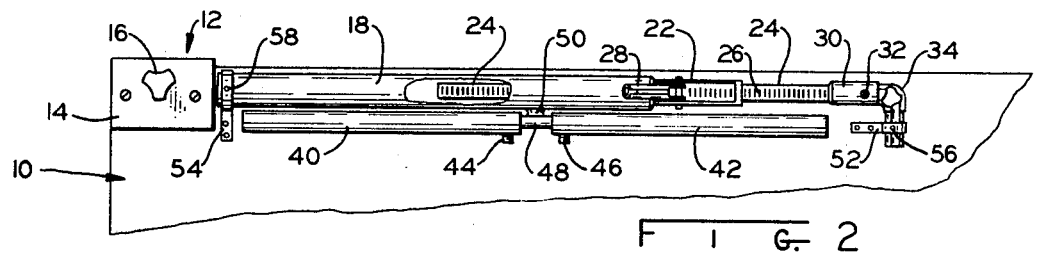
FIGURE 2 is a view looking up beneath the camper at one side and adjacent one corner and showing a jack collapsed and stored directly on the camper body.

It will be apparent that the jack, when knocked down and assembled in the manner in which it is shown in FIGURE 2, is quite compact and for this reason it can be placed on the underside of the body of camper 10, preferably adjacent to the pertaining corner of the camper, and held in place by the clips or straps 52 and 54 mounted on the underside of the camper and comprising the set screws 56 and 58 by means of which the jack can be secured tightly against the bottom of the camper. It will be apparent that other supporting clip arrangements could be employed for securing the jacks in place so that the clips 52 and 54 are to be considered as purely exemplary.

In operation, assuming the camper is mounted on a pickup truck and it is desired to remove the camper from the pickup truck, the jacks are removed from their stored positions underneath the side edges of the camper and are then disassembled from their storage condition as shown in FIGURE 2, and are then reassembled into their use condition as shown in FIGURE 1. The jacks are placed at the corners of the camper and are elevated until the upper ends of pipe sections 18 thereof receive the studs 16. Thereafter, further lifting movements of the jacks will commence to lift the camper vertically upwardly from the pickup truck body. It is understood, of course, that the connections of the camper with the pickup truck body have been released. When the camper is elevated to a certain point, the pickup truck can be driven from therebeneath. The camper can now remain in elevated position or lowered for storage or use, if so desired, until it is to be placed back on the pickup truck body.

It will be apparent that no harm to the camper will occur from uneven operation of the jacks and that there is no possibility of denting the side of the camper as is the case with a jack arrangement having a jack shaft extending upwardly through the top of the jack structure and along the side of the camper.

When the camper is returned to the pickup truck bed, the jacks can be removed and knocked down and reassembled to their FIGURE 2 condition and stored under the side edges of the camper body in the convenient manner shown.

It will be understood that this invention is susceptible to modification in order to adapt it to different usages and conditions; and accordingly, it is desired to comprehend such modifications within this invention as may fall within the scope of the appended claims.

What is claimed is:

1. A jack especially adapted for lifting a camper from a conveying vehicle and for lowering the camper to the conveying vehicle and comprising vertically extending telescoping upper and lower members and actuating means connecting said members to cause extension thereof for a lifting operation or collapsing thereof for a lowering operation, said upper member having means at its upper end for non-laterally shiftable engagement with cooperating means mounted on the lower part of the camper, said lower member having legs at the lower end thereof extending therefrom at right angles thereto and at an angle to each other, connector means at the lower end of said lower member supportingly but detachably connecting said legs to said lower member, and means for securing said legs when detached from said lower member to said upper member in substantially parallel relation thereto to form a compact assembly for easy storage and transport of the jack.

2. A jack according to claim 1 in which said connector means comprises a fitting member having a first projection adapted for substantially rigid connection to the lower end of said lower member, and other projections on said fitting member perpendicular to said first projection and at an angle to each other and adapted for substantially rigid but detachable connection with said legs.

3. A jack according to claim 2 in which at least said other projections are stud-like and said legs have sockets at their one ends to receive said stud-like other projections, and screw threaded means on said legs at the said one ends thereof for securing said legs to the respective said stud-like other projections.

4. A jack according to claim 3 in which said means for securing the said legs to said upper member comprises a rod-like element in parallel spaced relation to said upper member and secured in about its middle to said upper member so as to have its ends unobstructed for telescopically receiving said legs.

5. A jack according to claim 4 in which the same ends of the legs that receive said stud-like projections are also adapted to receive the ends of said rod-like element whereby one and the same screw threaded means can be employed for securing said legs to both said stud-like projections and said rod-like element.

6. A jack according to claim 2 in which said first projection of said fitting member is stud-like, said lower member of said jack being in the form of a solid bar, and a sleeve into which the lower end of said bar and said first projection extend into which sleeve said bar and said first projection are rigidly connected.

7. A jack according to claim 1 in which the upper member is tubular and said cooperating means on said camper is in the form of a bracket rigid with the camper and having a stud vertically dependent from the bracket at the bottom of the camper and adapted for being received in the upper end of said tubular upper member.

8. A jack according to claim 7 in which said camper comprises a said bracket at each corner thereof and a said jack is provided for each bracket.

9. A jack according to claim 1 in which the camper includes clip means on the bottom for detachably receiving and supporting the jack when the jack legs are detached from the said lower member and are connected to said upper member.

10. A jack according to claim 8 in which the camper includes clip means on the bottom adjacent each corner of the camper for detachably receiving and supporting a jack when the said legs thereof have been detached from the lower member thereof and have been connected to the said upper member thereof.

References Cited
UNITED STATES PATENTS

| | | | |
|---|---|---|---|
| 2,616,650 | 11/1952 | Thompson | 248—346 |
| 3,155,373 | 11/1964 | Rae | 254—45 |
| 3,314,655 | 5/1967 | Steele | 214—515 X |
| 3,415,490 | 12/1968 | Steele | 214—515 X |

OTHELL M. SIMPSON, Primary Examiner

D. R. MELTON, Assistant Examiner

U.S. Cl. X.R.

214—515